(12) United States Patent
Eda et al.

(10) Patent No.: US 11,138,160 B2
(45) Date of Patent: Oct. 5, 2021

(54) APPLICATION PERFORMANCE USING MULTIDIMENSIONAL PREDICTIVE ALGORITHM FOR AUTOMATED TIERING MECHANISMS

(71) Applicant: INTERNATIONAL BUSINESS MACHINES CORPORATION, Armonk, NY (US)

(72) Inventors: Sasikanth Eda, Vijayawada (IN); Akshat Mithal, Maharashtra (IN); Sandeep R. Patil, Pune (IN); Subhojit Roy, Pune (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 940 days.

(21) Appl. No.: 15/208,930

(22) Filed: Jul. 13, 2016

(65) Prior Publication Data
US 2018/0018379 A1   Jan. 18, 2018

(51) Int. Cl.
*G06F 7/00* (2006.01)
*G06F 17/30* (2006.01)
*G06F 16/185* (2019.01)

(52) U.S. Cl.
CPC ................. *G06F 16/185* (2019.01)

(58) Field of Classification Search
CPC ........ G06F 17/30569; G06F 17/30289; G06N 7/005
USPC ......................................... 707/756
See application file for complete search history.

(56) References Cited

U.S. PATENT DOCUMENTS

| | | | | |
|---|---|---|---|---|
| 5,893,139 A | * | 4/1999 | Kamiyama | G06F 12/08 711/117 |
| 6,269,382 B1 | * | 7/2001 | Cabrera | G06F 16/122 |
| 8,006,061 B1 | * | 8/2011 | Chatterjee | G06F 11/1076 711/170 |
| 8,006,111 B1 | * | 8/2011 | Faibish | G06F 3/0625 713/324 |
| 9,032,175 B2 | | 5/2015 | Gao et al. | |
| 9,116,914 B1 | * | 8/2015 | Muthirisavenugopal | G06F 16/185 |
| 9,423,962 B1 | * | 8/2016 | Basham | G06F 3/0604 |
| 10,176,212 B1 | * | 1/2019 | Prohofsky | G06F 3/0605 |
| 10,225,162 B1 | * | 3/2019 | Jain | G06F 3/0605 |
| 2009/0182957 A1 | * | 7/2009 | Yashiro | G06F 3/0685 711/156 |
| 2010/0121828 A1 | * | 5/2010 | Wang | G06F 16/188 707/694 |
| 2010/0274826 A1 | * | 10/2010 | Takata | G06F 3/0605 707/812 |
| 2011/0010514 A1 | * | 1/2011 | Benhase | G06F 3/061 711/162 |
| 2011/0029840 A1 | * | 2/2011 | Ozzie | H03M 13/05 714/763 |

(Continued)

*Primary Examiner* — Binh V Ho
(74) *Attorney, Agent, or Firm* — Griffiths & Seaton PLLC

(57) ABSTRACT

Various embodiments for managing data stored in a tiered data storage environment, by a processor device, are provided. A data file is proactively migrated from a lower tier to a higher tier of the tiered data storage environment by using a multidimensional algorithm adopting an actual frequency of access of the data file to gauge a slope of a predicted frequency of access of the data file. The data file is migrated from the lower tier to the higher tier only if each of a plurality of criteria of the multidimensional algorithm is satisfied.

21 Claims, 6 Drawing Sheets

(56) References Cited

U.S. PATENT DOCUMENTS

| | | | | |
|---|---|---|---|---|
| 2011/0202909 A1* | 8/2011 | Meijer | ............... | G06F 8/45 |
| | | | | 717/151 |
| 2011/0314069 A1* | 12/2011 | Alatorre | ............... | G06F 16/122 |
| | | | | 707/827 |
| 2012/0023146 A1* | 1/2012 | Shoji | ............... | G06F 3/0617 |
| | | | | 707/827 |
| 2012/0023292 A1* | 1/2012 | Saito | ............... | G06F 3/0665 |
| | | | | 711/114 |
| 2012/0036327 A1* | 2/2012 | Jennas, II | ............... | G06F 3/0685 |
| | | | | 711/137 |
| 2013/0185493 A1* | 7/2013 | Benhase | ............... | G06F 12/128 |
| | | | | 711/105 |
| 2013/0290598 A1* | 10/2013 | Fiske | ............... | G06F 3/0625 |
| | | | | 711/103 |
| 2013/0339393 A1* | 12/2013 | Gaur | ............... | G06F 16/211 |
| | | | | 707/792 |
| 2014/0207954 A1* | 7/2014 | Calo | ............... | G06F 9/00 |
| | | | | 709/226 |
| 2014/0254042 A1* | 9/2014 | Yeo | ............... | G11B 20/1217 |
| | | | | 360/48 |
| 2014/0297977 A1* | 10/2014 | Sueda | ............... | G06F 3/067 |
| | | | | 711/160 |
| 2015/0039837 A1 | 2/2015 | Quan et al. | | |
| 2015/0169448 A1 | 6/2015 | Gupta et al. | | |
| 2015/0269067 A1* | 9/2015 | Pendharkar | ............... | G06F 12/023 |
| | | | | 711/126 |
| 2015/0277762 A1* | 10/2015 | Guo | ............... | G06F 3/0653 |
| | | | | 711/154 |
| 2017/0070574 A1* | 3/2017 | Sawada | ............... | G06F 15/167 |

* cited by examiner

| VOLUME NAME: VOLUME A | TIME STAMPS | IOPS COUNT | AUTOMATED TIERING EXTENT DISTRIBUTION WITHOUT PREDICTION LOGIC INPUT | | | LATENCY |
|---|---|---|---|---|---|---|
| | | | NL-SAS | SAS | SSD | (in ms) |
| | T1 | 10K | 90% | 10% | 0% | 2 |
| | T2 | 100K | 70% | 30% | 20% | 10 |
| | T3 | 500K | 50% | 40% | 10% | 100 |
| | T4 | 1M | 20% | 50% | 30% | 2000 |

| VOLUME NAME: VOLUME A | TIME STAMPS | NUMBER OF IOPS LIKELY BASED ON SVM PREDICTIVE ALGORITHM | RECOMMENDATION FOR DISTRIBUTION OF EXTENTS TO STORAGE CONTROLLER | | | LATENCY |
|---|---|---|---|---|---|---|
| | | | NL-SAS | SAS | SSD | (in ms) |
| | T1 | 10K | 50% | 50% | 0% | 1 |
| | T2 | 100K | 30% | 50% | 20% | 2 |
| | T3 | 500K | 0% | 50% | 50% | 5 |
| | T4 | 1M | 0% | 0% | 100% | 5 |

APPLICATION PERFORMANCE USING MULTIDIMENSIONAL PREDICTIVE ALGORITHM FOR AUTOMATED TIERING MECHANISMS

BACKGROUND OF THE INVENTION

Field of the Invention

The present invention relates in general to computing systems, and more particularly, to various embodiments for managing data stored in a tiered data storage environment.

Description of the Related Art

In today's society, computer systems are commonplace. Computer systems may be found in the workplace, at home, or at school. As computer systems become increasingly relied upon, convenient, and portable, the Internet has grown exponentially. Now more than ever, individuals and businesses rely upon distributed storage systems (commonly referred to as "the cloud") to store information and data. As wide strides in technological advancement relating to data access devices have been accomplished, there is an ever-growing demand for growth and development within the back end supporting systems that provide and store the data content.

SUMMARY OF THE INVENTION

Various embodiments for managing data stored in a tiered data storage environment, by a processor device, are provided. In one embodiment, a method comprises proactively migrating a data file from a lower tier to a higher tier of the tiered data storage environment by using a multidimensional algorithm adopting an actual frequency of access of the data file to gauge a slope of a predicted frequency of access of the data file; wherein the data file is migrated from the lower tier to the higher tier if each of a plurality of criteria of the multidimensional algorithm is satisfied.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 6A illustrates a chart diagram of performance values in a tiered data storage environment, in accordance with aspects of the present invention; and FIG. 6B illustrates an additional chart diagram of performance values in a tiered data storage environment, in accordance with aspects of the present invention.

DETAILED DESCRIPTION OF THE DRAWINGS

Figure 1:
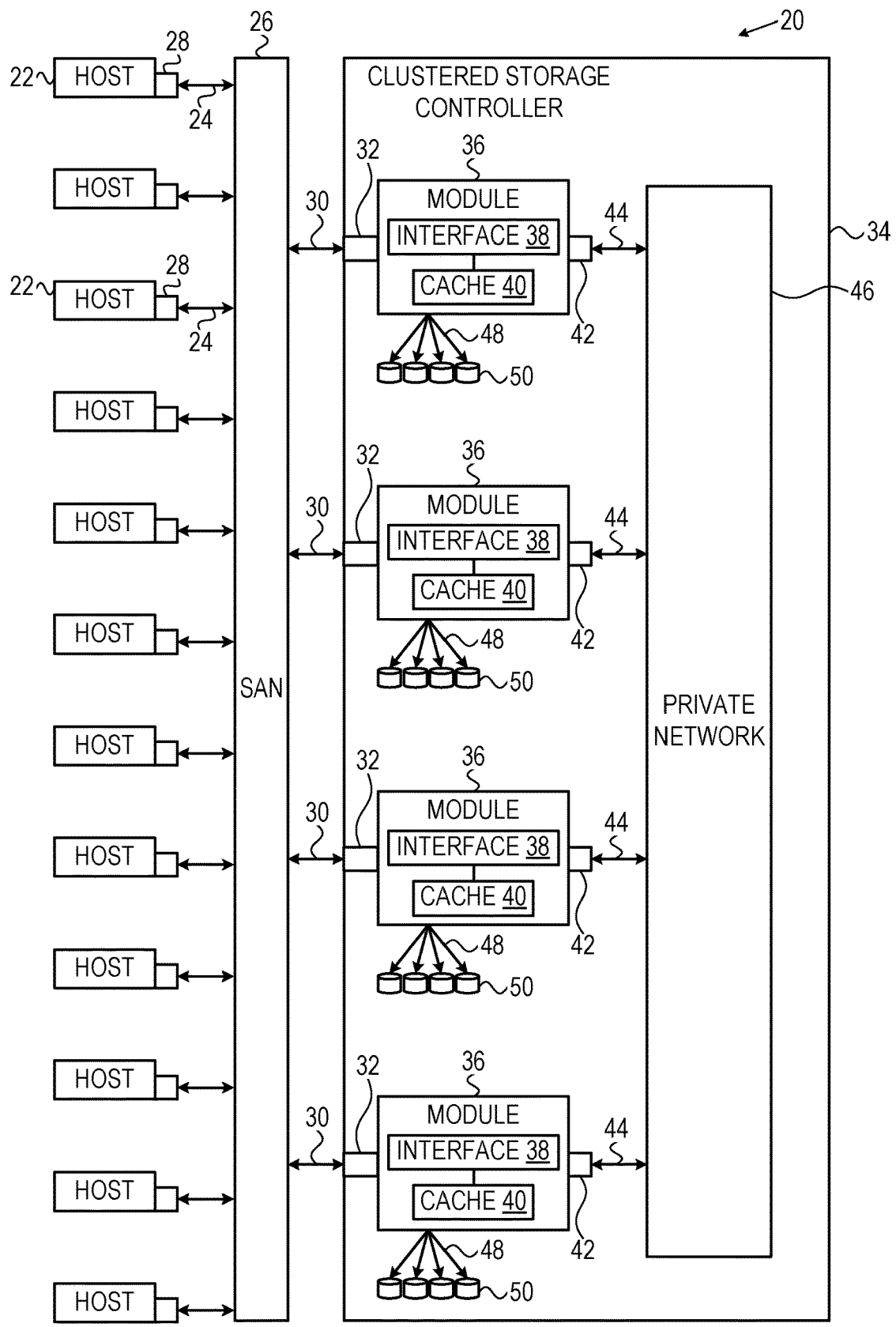
FIG. 1 illustrates a block diagram of a computer storage environment in which aspects of the present invention may be realized.

Described embodiments, and illustrative figures of various embodiments for managing data stored in a tiered data storage environment are to follow. In the interest of clarity, not all features of an actual implementation are described in this Specification. It will of course be appreciated by the skilled artisan, that in the development of any such actual embodiment, numerous implementation-specific decisions must be made to achieve the developers' specific goals, such as compliance with system-related and business-related constraints, which will vary from one implementation to another. Furthermore, it will be appreciated that such a development effort may be complex and labor-intensive, but would nevertheless be a routine undertaking for those of ordinary skill in the art having the benefit of this Disclosure.

Data tiering in large storage environments is a commonly used mechanism to distribute classifications of data over various storage devices based upon performance, operating costs, etc. For example, IBM® Easy Tier™ is a performance function used in storage environments that automatically and non-disruptively migrates frequently accessed data from magnetic media to solid-state drives (SSDs). In this way, the most frequently accessed data is stored on the fastest storage tier, and the overall performance is improved. It works in such a way that every volume is split into logical units called extents. Easy Tier™ is based on algorithms that are developed by IBM Research, which evaluates the access frequency of each extent. Each extent is rated according to the number of I/Os going to that extent. Extents with a high rating, receiving the most I/Os, are marked as "hot" extents and become candidates for migration to SSDs in the same storage pool. Periodically, but no greater than 24 hours, a migration plan is created according to the "heat" of the extents and the data is migrated to the SSD MDisk (managed disk). When the SSD becomes full, and there is a hotter extent to move onto the SSD, the "cooled" extents are migrated back to the lower-tiered MDisk (managed disk). These automated tiering mechanisms may apply to a wide variety of storage architectures, such as a traditional storage area network (SAN), and traditional or erasure coded object storage architectures.

However, as aforementioned, "periodically" the migration plan is created based upon the heat of the extents, and in some cases, this observation period may be up to 24 hours before the extents are then recognized as hot and migrated from a lower tier (slower media) to a higher tier (faster media) in the storage environment. This reactive approach can be overly burdensome in some scenarios, with particular regard to the nature of evolvement the Internet/storage industry sees today.

Consider the following example: A virtual machine hosting a webpage is created on a volume derived out of a storage controller pool having disks of different classes of disk types (SSD, SAS, etc.) and with the storage pool having automated tiering functionality "ON". Consider at the initial stages the webpage generates very minimal workload, and thus all its data extents (logical blocks of a volume) are residing on SAS drives. Assume the webpage then hosts a video that becomes a sudden, surprise hit (i.e., its access frequency rises exponentially). This would cause a corresponding sudden increase in the number of I/O operations to this volume and would inevitably result in storage bottlenecks due to the underlying SAS drivers. When the storage controller's automated tiering code finally realizes (and in some cases, controllers have an observation window of up to 24 hours) that this particular set of extents of the volume are being accessed frequently, it only then starts to migrate those extents to its faster tier. This reactive approach is inefficient and may even cause failures in cases of extremely high workload demand.

Accordingly, the present invention contemplates a new proactive approach to migrating data within automated storage tiering environments using a multidimensional predictive algorithm to gauge a slope of a predicted frequency of access of the extents, objects, or object fragments.

The mechanisms illustrated below may be applicable to a variety of network topologies and network components as will be further described. Notwithstanding the illustration of some of the functionality attendant to the various embodiments, one of ordinary skill will appreciate that the methodologies herein may be adapted to a wide variety of implementations and scenarios as noted above.

Turning now to FIG. 1, a schematic pictorial illustration of a data processing storage subsystem 20 is shown, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally, or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While not explicitly shown for purposes of illustrative simplicity, the skilled artisan will appreciate that in some embodiments, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Figure 2:
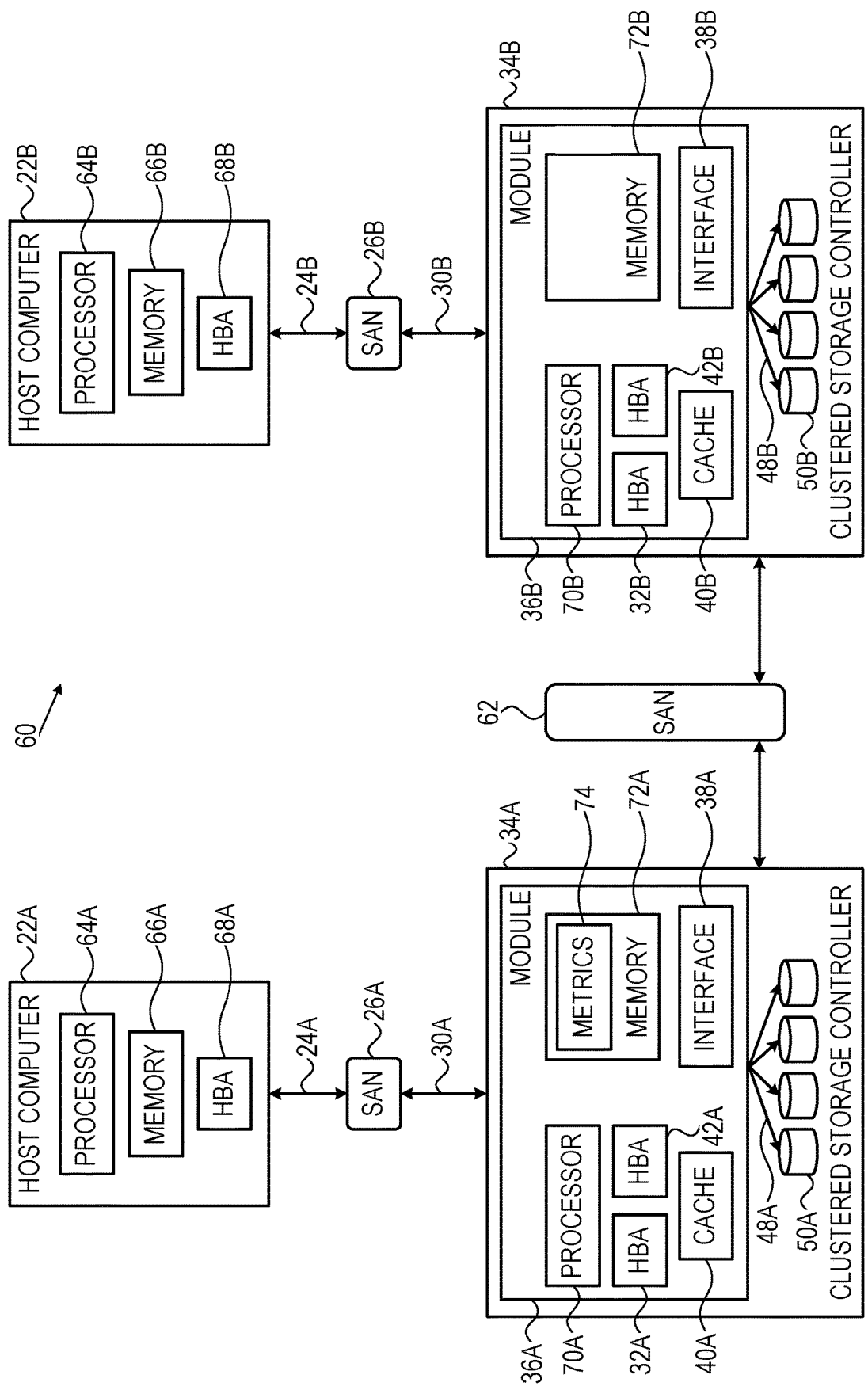
FIG. 2 illustrates a block diagram of a hardware structure of a data storage system in which aspects of the present invention may be realized.

FIG. 2 is a schematic pictorial illustration of facility 60 configured to perform host computer monitoring, in accordance with an embodiment of the present invention. In the description herein, host computers 22, storage controllers 34 and their respective components may be differentiated by appending a letter to the identifying numeral, so that facility 60 comprises a first host computer 22A (also referred to herein as a primary host computer) coupled to a clustered storage controller 34A via a SAN 26A, and a second host computer 22B (also referred to herein as a secondary host computer) coupled to a clustered storage controller 34B via a SAN 26B. In the configuration shown in FIG. 2, storage controllers 34A and 34B are coupled via a facility SAN 62.

Host computer 22A comprises a processor 64A, a memory 66A, and an adapter 68A. Adapter 68A is coupled to SAN 26A via a data connection 24A.

As described supra, module 36A is coupled to storage devices 50A via data connections 48A, and comprises adapters 32A and 42A, a cache 40A, and an interface 38A. Module 36A also comprises a processor 70A and a memory 72A. As explained in detail hereinbelow, processor 70A is configured to establish metrics 74 that indicate a connectivity status of host computer 22A, and store the metrics to memory 72A. In some embodiments, processor 70A may store metrics 74 to storage devices 50A.

Host computer 22B comprises a processor 64B, a memory 66B, and an adapter 68B. Adapter 68B is coupled to SAN 26B via a data connection 24B.

As described supra, module 36B is coupled to storage devices 50B via data connections 48B, and comprises adapters 32B and 42B, a cache 40B, and an interface 38B. Module 36B also comprises a processor 70B and a memory 72B.

Processors 64A, 64B, 70A and 70B typically comprise general-purpose computers, which are programmed in software to carry out the functions described herein. The software may be downloaded to host computers 22A and 22B and modules 36A and 36B in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

Examples of adapters 32A, 32B, 42A, 42B, 68A and 68B, include switched fabric adapters such as Fibre Channel (FC) adapters, Internet Small Computer System Interface (iSCSI) adapters, Fibre Channel over Ethernet (FCoE) adapters and Infiniband™ adapters.

While the configuration shown in FIG. 2 shows storage host computers 22A and 22B coupled to storage controllers 34A and 34B via SANs 26A and 26B, other configurations are to be considered within the spirit and scope of the present invention. For example, host computers 22A and 22B can be coupled to a single storage controller 34 via a single SAN 26.

Figure 3:
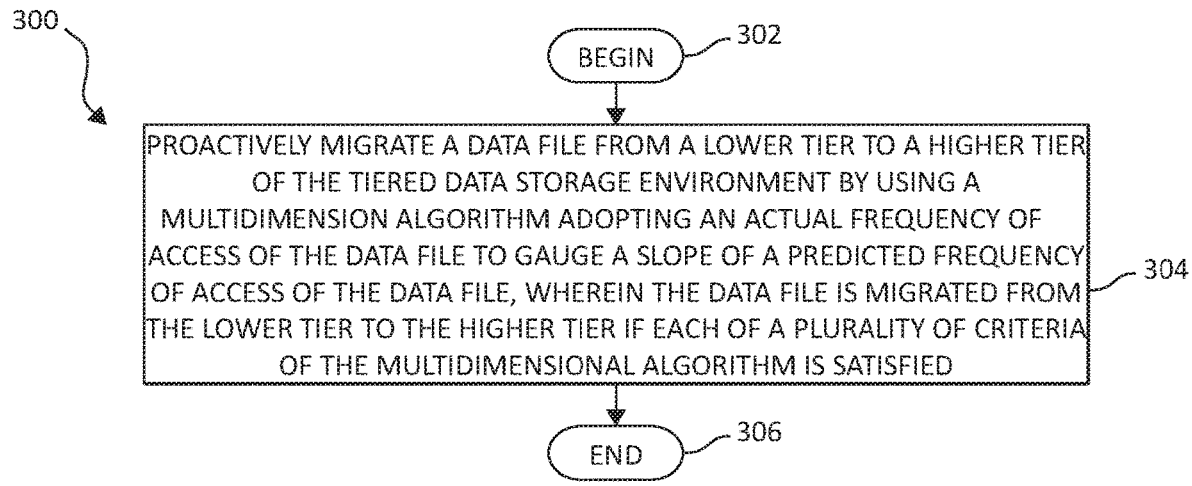
FIG. 3 illustrates a flowchart of a method for managing data stored in a tiered data storage environment, in accordance with aspects of the present invention.

Continuing, FIG. 3 illustrates a method 300 for managing data stored in a tiered data storage environment, in accordance with one embodiment of the present invention. The method 300 may be performed in accordance with the present invention in any of the environments depicted in FIGS. 1-2, among others, in various embodiments. Of course, more or less operations than those specifically described in FIG. 3 may be included in method 300, as would be understood by one of skill in the art upon reading the present descriptions.

Each of the steps of the method 300 may be performed by any suitable component of the operating environment. For example, in various embodiments, the method 300 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a field programmable gate array (FPGA), etc., combinations thereof, or any other suitable computing device known in the art.

Beginning (step 302), a data file is proactively migrated from a lower tier to a higher tier of the tiered data storage environment by using a multidimensional algorithm adopting an actual frequency of access of the data file to gauge a slope of a predicted frequency of access of the data file. The data file is migrated from the lower tier to the higher tier only if each of a plurality of criteria of the multidimensional algorithm is satisfied (step 304). The method ends (step 306).

As previously discussed, media files may be created out of filesystems on a virtual machine hosted over a hypervisor or out of a physical host. These filesystems are usually created on logical volumes exported out of storage controller arrays, and most of the storage controller arrays have automated storage tiering code. Storage Controller Automated Storage Tiering Code (for example, Easy Tier™ feature of SAN Volume Controller, SVC/Storwize™ family) monitors I/O patterns occurring on all volumes of a storage pool made up of arrays of various disk types like flash arrays, solid state disks, and hard disk drives. If these pools have tiering functionality on, then based on frequency of data access per extent, data migration is performed from hard disk drive arrays to flash arrays, solid state drive arrays and vice versa. Storwize™ creates a "dpa.heat" map file for storage pools. This file is used by Easy Tier™ Data Placement Advisor Code to prepare a migration plan based on a cost and benefit analysis. Similar heat files are being created by other storage controller arrays for making decisions to migrate extents from slower tier to faster tier and vice versa. Predictive algorithms such as SVM (Support Vector Machines) may be deployed for database applications working directly on a block layer to determine which blocks are most likely to be accessed. This intelligence may then be shared with the storage controller to proactively migrate these extents to a faster tier.

The present invention provides embodiments for a framework and algorithm to help facilitate the prediction of growth for a particular set of data or objects/object fragments stored among a set of unclassified data or objects/object fragments. The mechanisms provided herein leverage the automated tiering mechanisms of tiered storage environments to improve efficiency and performance of such functionality. Again, as previously mentioned, the mechanisms provided herein may be adapted to traditional SAN environments or object storage architectures.

In a traditional SAN environment, the multidimensional algorithm identifies an application deployed using volumes and monitors I/O patterns per data block. Based on a multi-dimensional time series pattern formed using the collected data, the algorithm forms a prediction of expected growth in access per data block (using Support Vector Machines time series prediction, where 'R' may be a language to implement the prediction algorithm). The predicted growth in access per block is reported to the tiering scheduler, wherein the proposed framework triggers the migration toolkit embedded in the tiering scheduler such that the blocks which are expected to have future growth are migrated to faster storage tier irrespective of a configured observation window and where the migration rate is dependent upon the slope of the access growth, size of the block etc.

In a hierarchal/erasure coded object storage environment, the multidimensional algorithm identifies an application deployed using a proxy node service and monitors I/O patterns per object fragment. Based on a multi-dimensional time series pattern formed using the collected data, the algorithm forms a prediction of expected growth in access per object fragment among a group of overall object fragments (using Support Vector Machines time series prediction, where 'R' can be a language to implement the prediction algorithm). The predicted growth in access per object fragment is reported to the tiering scheduler, wherein the proposed framework triggers the migration toolkit embedded in the tiering scheduler such that the object fragments which are expected to have future growth are migrated to faster storage tier irrespective of the configured observation window and where the migration rate is dependent upon the slope of the access growth, size of the block, etc.

Figure 4:
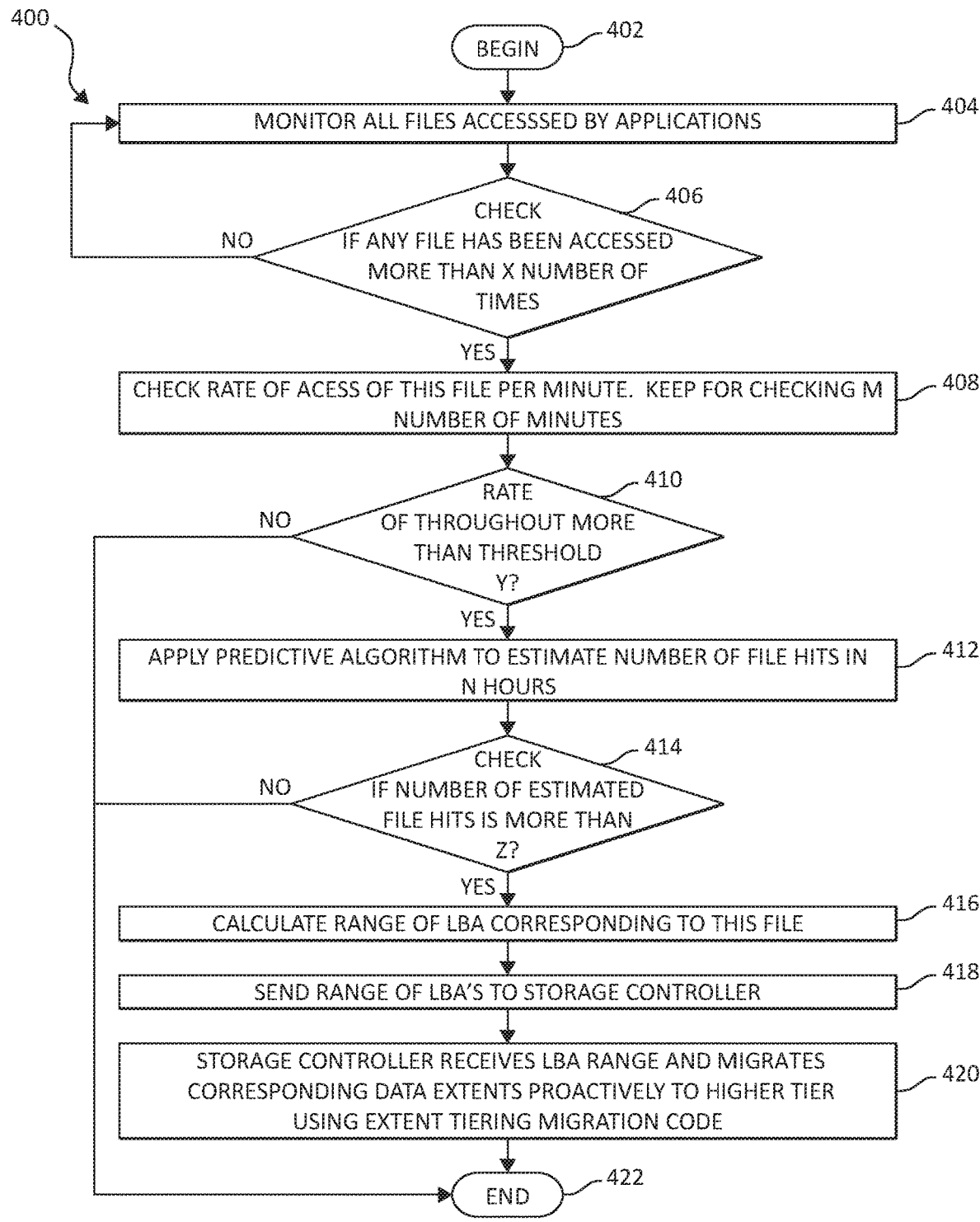
FIG. 4 illustrates an additional flowchart of a method for managing data stored in a tiered data storage environment, in accordance with aspects of the present invention.

Advancing, FIG. 4 illustrates a method 400 for managing data stored in a tiered data storage environment, in accordance with one embodiment of the present invention. The method 400 may be performed in accordance with the present invention in any of the environments depicted in FIGS. 1-2, among others, in various embodiments. Of course, more or less operations than those specifically described in FIG. 4 may be included in method 400, as would be understood by one of skill in the art upon reading the present descriptions.

Each of the steps of the method 400 may be performed by any suitable component of the operating environment. For example, in various embodiments, the method 400 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 400. Illustrative processors include, but are not limited to, a central processing unit (CPU), an application specific integrated circuit (ASIC), a field programmable gate array (FPGA), etc., combinations thereof, or any other suitable computing device known in the art.

It is important to note that throughout the proceeding flowchart, as well as throughout the disclosure, the term "data file" may be interchanged with data blocks, data objects, data object fragments, and the like. As aforementioned, and as one of ordinary skill in the art would recognize, the functionality provided by the mechanisms of the present invention are applicable to a wide variety of storage environments and architectures. As such, the use of one terminology is simply provided to help facilitate ease of understanding and should not be considered as limiting in scope or spirit. Additionally, italic letters (e.g., x, m, y, z) are referenced which are provided simply as a placeholder for any respective number which may be employed for effectuating the mechanisms of the present invention.

Beginning (step 402), all data files associated with a lower tier of the tiered storage architecture are monitored which are being accessed by applications (step 404). A determination is made of the number of times any particular data file has been accessed. If any data file, at step 406, has not been accessed x number of times as determined by a threshold, the method 400 returns to monitoring each data file (step 404).

If, at step 406, a particular data file has been accessed x number of times, a rate of access is determined for the particular data file, meaning how often the data file is being accessed over a given period of time (e.g. the data file is being accessed 100 times over a time period of 1 minute). The determination of the rate of access for the particular data file is performed for m minutes (step 408). A determination is then made as to whether, at the conclusion of the m minutes, the rate of access crosses a y threshold (step 410). If the rate of access over m minutes of the particular data file does not cross they threshold, the method 400 ends (step 422).

Returning to step 410, if, the particular data file is crossing they threshold associated with its rate of access, a predictive algorithm is applied to the particular data file to estimate a slope of the particular data file's frequency of access as a number of file hits over n hours (e.g. 24 hours) (step 412). Another determination is then made as to whether the predicted frequency of access of the particular data file crosses a number z, as determined by a threshold (step 414). If, at step 414, the estimated frequency of access of the particular data file does not cross the z threshold, as estimated by the predictive algorithm, the method 400 ends (step 422).

Returning to step 414, if the estimated frequency of access of the particular data file crosses the z threshold, as estimated by the predictive algorithm, a logical block address (LBA) range is calculated corresponding to the particular data file (step 416). The calculated LBA range corresponding to the particular data file is then sent to the storage controller (step 418). The storage controller (having automated tiering mechanism "on") receives the calculated LBA range corresponding to the particular data file and proactively migrates the data file as associated with the calculated LBA range to a higher tier (e.g. solid state tier) of the tiered storage architecture (step 420). The method ends (step 422).

Figure 5:
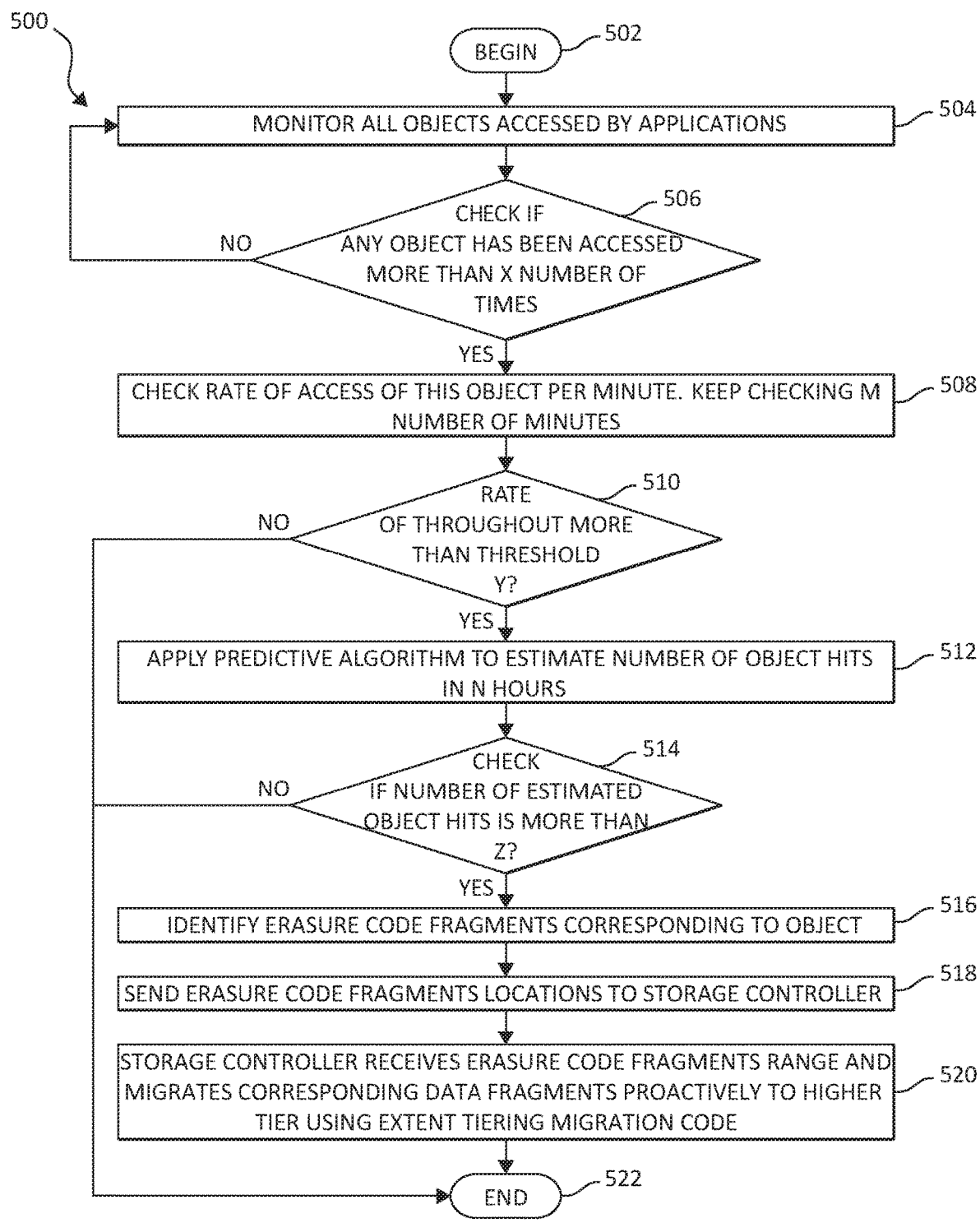
FIG. 5 illustrates still an additional flowchart of a method for managing data stored in a tiered data storage environment, in accordance with aspects of the present invention.

FIG. 5 illustrates a method 500 for managing data stored in a tiered data storage environment, in accordance with one embodiment of the present invention. The method 500 may be performed in accordance with the present invention in any of the environments depicted in FIGS. 1-2, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

Similar to FIG. 4, FIG. 5 illustrates the advantages of the functionality of the present invention in an erasure coded object storage environment. The method 500 begins (step 502), all objects associated with a lower tier of the tiered storage architecture are monitored which are being accessed by applications (step 504). A determination is made of the number of times any particular object has been accessed. If any object, at step 506, has not been accessed x number of times as determined by a threshold, the method 500 returns to monitoring all objects in the environment (step 504).

If, at step 506, a particular object has been accessed x number of times, a rate of access is determined for the particular object, meaning how often the object is being accessed over a given period of time (e.g. the object is being accessed 100 times over a time period of 1 minute). The determination of the rate of access for the particular object is performed for m minutes (step 508). A determination is then made as to whether, at the conclusion of the m minutes, the rate of access crosses a y threshold (step 510). If the rate of access over m minutes of the particular object does not cross they threshold, the method 500 ends (step 522).

Returning to step 510, if, the particular object is crossing they threshold associated with its rate of access, a predictive algorithm is applied to the particular object to estimate a slope of the particular object's frequency of access as a number of object hits over n hours (e.g. 24 hours) (step 512). Another determination is then made as to whether the predicted frequency of access of the particular object crosses a number z, as determined by a threshold (step 514). If, at step 514, the estimated frequency of access of the particular object does not cross the z threshold, as estimated by the predictive algorithm, the method 500 ends (step 522).

Returning to step 514, if the estimated frequency of access of the particular object crosses the z threshold, as estimated by the predictive algorithm, erasure code fragments and their associated locations are identified corresponding to the particular object (step 516). The identified erasure code fragment locations corresponding to the particular object are then sent to the storage controller (step 518). The storage controller (having automated tiering mechanism "on") receives the identified erasure code fragment locations corresponding to the particular object and proactively migrates the object fragments as associated with the identified erasure code fragment locations to a higher tier (e.g. solid state tier) of the tiered storage architecture (step 520). The method ends (step 522).

The proactive approach to migrating hot data from the lower tier to the higher tier of the storage architecture greatly improves storage environment efficiency and reduces bottlenecks caused especially by data workloads (e.g. extents) which suddenly become hot based upon access. One performance criteria which exponentially improves is latency reduction within the environment.

FIG. 6A and FIG. 6B each illustrate chart diagrams of performance values in a tiered data storage environment, in accordance with aspects of the present invention. Note that charts 600 and 650 are not actual calculated values but rather provided for demonstration and ease of understanding the benefits provided under the mechanisms of the present invention.

Here, in both charts 600 and 650, Volume A is created with a storage controller using NL-SAS drives (such that 100% of extents are on these type of drives), and is hosting a webpage on a physical/virtual machine host. The environment is driving a workload corresponding to 1K input/output operations per second (IOPS) in a slightly increasing pattern. Based on this application workload pattern, using a predictive algorithm like the aforementioned SVM, it is predicted that at time T1, IOPS are likely to increase to 10K. At time T2, IOPS are likely to increase to 100K. At time T3, IOPS are likely to increase to 500K and at time T4, IOPS should be reaching up to 1 million TOPS.

Even assuming that the time between T1 and T4 is between the storage controller's predefined migration observation window, one can see that with no intervention, chart 600 shows that as the time progresses, the latency of the volume is exponentially increased as the IOPS count increases, due to the extents being spread over various classifications of storage devices. This happens because the storage controller has no sense of predicting which tier the extents should be migrated to (i.e. the storage controller does not simply migrate from the lowest tier to the highest tier, but rather moves some extents up a tier, observes for a time, moves more extents to a higher tier, observes, etc.). By the time the IOPS count reaches 1 million, the storage controller is vast behind and thus bottlenecks and latency for the volume inevitably occur.

Referring to chart 650, one can see that using the predictive logic of the present invention, a more educated and complete recommendation is provided to the storage controller as to the distribution of the volume's extents thereby the storage controller may anticipate the IOPS will reach 1 million at time T4, and therefore have proactively moved all the volume's extents to the highest and fastest tier in the architecture. Thus, as the data access has been anticipated, latency is reduced and the efficiency and performance of the overall storage environment is increased.

As one of ordinary skill in the art would appreciate, this predictive logic may also be applied conversely as to declining workloads. That is, for declining workloads associated with data stored in a higher tier of the architecture, the predictive algorithm may be applied as to provide the storage controller with an educated recommendation to move the extents associated with the declining workload to a lower tier. As flash and solid state drives have a lesser lifespan and are costlier to store data within, the predictive logic may be applied to provide better usage and, again, increase overall storage environment performance and efficiency.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for managing data stored in a tiered data storage environment, by a processor device, comprising:

maintaining data within the tiered data storage environment by a storage controller implementing a first storage migration algorithm, wherein the first storage migration algorithm includes a configured observation window to monitor access of the data and perform migration between storage tiers according to the monitored access; and implementing, in addition to and independent of the first storage migration algorithm, a second storage migration algorithm by the storage controller to proactively and automatically migrate a data file of the data from a lower tier to a higher tier of the storage tiers by using a multidimensional algorithm, computed using a support-vector machine, adopting an actual frequency of access of the data file to gauge a slope of a predicted frequency of access of the data file such that a migration rate when performing the migration of the data file under the second storage migration algorithm is dependent upon the slope of an access growth of the predicted frequency of access, wherein the data file is migrated from the lower tier to the higher tier, under the second storage migration algorithm, if each of a plurality of criteria of the multidimensional algorithm is satisfied notwithstanding the data file is migrated irrespective of whether the actual frequency of access of the configured observation window satisfies the first storage migration algorithm enacted on the data file; and wherein migrating the data file at the migration rate dependent upon the slope of the access growth includes selecting the higher tier, according to the slope of the access growth, to migrate the data file to notwithstanding whether the higher tier is immediately next in hierarchal order to a current tier in which the data file resides.

2. The method of claim 1, further including monitoring the data file to determine that the data file has been accessed a number of times over a first predetermined threshold.

3. The method of claim 2, further including, upon determining that the data file has been accessed the number of times over the first predetermined threshold, monitoring a rate of access of the data file over a first predetermined time period to determine the data file has the rate of access over a second predetermined threshold.

4. The method of claim 3, further including determining the data file has the rate of access over the second predetermined threshold, gauging the slope of the predicted frequency of access by estimating the number of times the data file will be accessed over a second predetermined time period.

5. The method of claim 4, further including determining the data file has a predicted access over a third predetermined threshold based upon the slope of the predicted frequency of access over the second predetermined time period.

6. The method of claim 5, further including, upon determining the data file has the predicted access over the third predetermined threshold, calculating a logical block address (LBA) range associated with the data file.

7. The method of claim 6, further including sending the LBA range associated with the data file to the storage controller; and proactively migrating, by the storage controller, extents of the LBA range associated with the data file from the lower tier to the higher tier of the tiered data storage environment.

8. A system for managing data stored in a tiered data storage environment, the system comprising:

the tiered data storage environment; and a processor device operational within a storage controller of the tiered data storage environment, wherein the processor device:

maintains data within the tiered data storage environment by the storage controller implementing a first storage migration algorithm, wherein the first storage migration algorithm includes a configured observation window to monitor access of the data and perform migration between storage tiers according to the monitored access; and implements, in addition to and independent of the first storage migration algorithm, a second storage migration algorithm by the storage controller to proactively and automatically migrate a data file of the data from a lower tier to a higher tier of the storage tiers by using a multidimensional algorithm, computed using a support-vector machine, adopting an actual frequency of access of the data file to gauge a slope of a predicted frequency of access of the data file such that a migration rate when performing the migration of the data file under the second storage migration algorithm is dependent upon the slope of an access growth of the predicted frequency of access, wherein the data file is migrated from the lower tier to the higher tier, under the second storage migration algorithm, if each of a plurality of criteria of the multidimensional algorithm is satisfied notwithstanding the data file is migrated irrespective of whether the actual frequency of access of the configured observation window satisfies the first storage migration algorithm enacted on the data file; and wherein migrating the data file at the migration rate dependent upon the slope of the access growth includes selecting the higher tier, according to the slope of the access growth, to migrate the data file to notwithstanding whether the higher tier is immediately next in hierarchal order to a current tier in which the data file resides.

9. The system of claim 8, wherein the processor device monitors the data file to determine that the data file has been accessed a number of times over a first predetermined threshold.

10. The system of claim 9, wherein the processor device, upon determining that the data file has been accessed the number of times over the first predetermined threshold, monitors a rate of access of the data file over a first predetermined time period to determine the data file has the rate of access over a second predetermined threshold.

11. The system of claim 10, wherein the processor device determines the data file has the rate of access over the second predetermined threshold, gauging the slope of the predicted frequency of access by estimating the number of times the data file will be accessed over a second predetermined time period.

12. The system of claim 11, wherein the processor device determines the data file has a predicted access over a third predetermined threshold based upon the slope of the predicted frequency of access over the second predetermined time period.

13. The system of claim 12, wherein the processor device, upon determining the data file has the predicted access over the third predetermined threshold, calculates a logical block address (LBA) range associated with the data file.

14. The system of claim 13, wherein the processor device sends the LBA range associated with the data file to the storage controller; and proactively migrates, by the storage controller, extents of the LBA range associated with the data file from the lower tier to the higher tier of the tiered data storage environment.

15. A computer program product for managing data stored in a tiered data storage environment, by a processor device, the computer program product embodied on a non-transitory computer-readable storage medium having computer-readable program code portions stored therein, the computer-readable program code portions comprising:

an executable portion that maintains data within the tiered data storage environment by a storage controller implementing a first storage migration algorithm, wherein the first storage migration algorithm includes a configured observation window to monitor access of the data and perform migration between storage tiers according to the monitored access; and an executable portion that implements, in addition to and independent of the first storage migration algorithm, a second storage migration algorithm by the storage controller to proactively and automatically migrate a data file of the data from a lower tier to a higher tier of the storage tiers by using a multidimensional algorithm, computed using a support-vector machine, adopting an actual frequency of access of the data file to gauge a slope of a predicted frequency of access of the data file such that a migration rate when performing the migration of the data file under the second storage migration algorithm is dependent upon the slope of an access growth of the predicted frequency of access, wherein the data file is migrated from the lower tier to the higher tier, under the second storage migration algorithm, if each of a plurality of criteria of the multidimensional algorithm is satisfied notwithstanding the data file is migrated irrespective of whether the actual frequency of access of the configured observation window satisfies the first storage migration algorithm enacted on the data file; and wherein migrating the data file at the migration rate dependent upon the slope of the access growth includes selecting the higher tier, according to the slope of the access growth, to migrate the data file to notwithstanding whether the higher tier is immediately next in hierarchal order to a current tier in which the data file resides.

16. The computer program product of claim 15, further including an executable portion that monitors the data file to determine that the data file has been accessed a number of times over a first predetermined threshold.

17. The computer program product of claim 16, further including an executable portion that, upon determining that the data file has been accessed the number of times over the first predetermined threshold, monitors a rate of access of the data file over a first predetermined time period to determine the data file has the rate of access over a second predetermined threshold.

18. The computer program product of claim 17, further including an executable portion that determines the data file has the rate of access over the second predetermined threshold, gauging the slope of the predicted frequency of access by estimating the number of times the data file will be accessed over a second predetermined time period.

19. The computer program product of claim 18, further including an executable portion that determines the data file has a predicted access over a third predetermined threshold based upon the slope of the predicted frequency of access over the second predetermined time period.

20. The computer program product of claim 19, further including an executable portion that, upon determining the data file has the predicted access over the third predetermined threshold, calculates a logical block address (LBA) range associated with the data file.

21. The computer program product of claim 20, further including an executable portion that sends the LBA range associated with the data file to the storage controller; and proactively migrates, by the storage controller, extents of the LBA range associated with the data file from the lower tier to the higher tier of the tiered data storage environment.

* * * * *